(12) United States Patent
Ohtani et al.

(10) Patent No.: US 6,404,805 B1
(45) Date of Patent: *Jun. 11, 2002

(54) BIT ERROR MEASURING DEVICE FOR MODEM DEVICE AND BIT ERROR MEASURING METHOD FOR THE SAME

(75) Inventors: Morito Ohtani; Takao Suzuki, both of Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/198,250

(22) Filed: Nov. 24, 1998

(30) Foreign Application Priority Data

Nov. 26, 1997 (JP) .............................................. 9-324893

(51) Int. Cl.[7] ................................................ H04B 1/38
(52) U.S. Cl. ...................... 375/222; 375/222; 714/704; 714/707; 714/738; 714/744
(58) Field of Search ........................ 375/222; 714/704, 714/724, 738, 744, 707, 742

(56) References Cited

U.S. PATENT DOCUMENTS

| | | | | |
|---|---|---|---|---|
| 5,623,497 A | * | 4/1997 | Shimawaki et al. | ........ 714/704 |
| 5,761,216 A | * | 6/1998 | Sotome et al. | ............... 714/738 |
| 6,170,069 B1 | * | 1/2001 | Ohtani et al. | ................ 714/704 |

* cited by examiner

*Primary Examiner*—Chi Pham
*Assistant Examiner*—Khanh Cong Tran
(74) *Attorney, Agent, or Firm*—Oliff & Berridge, PLC

(57) ABSTRACT

A bit error measuring device for modem device, comprises; a bit error measuring unit for measuring a bit error in an input signal from the modem device, a clock controlling unit for controlling an output of a clock signal on the basis of a control signal outputted from the modem device, and a test pattern transmitting unit for transmitting a test pattern signal by synchronizing with the clock signal when clock pulses of the clock signal are outputted from the clock controlling unit, and for stopping a transmission of the test pattern signal when the clock pulses of the clock signal are not outputted from the clock controlling unit.

10 Claims, 4 Drawing Sheets

BIT ERROR MEASURING DEVICE FOR MODEM DEVICE AND BIT ERROR MEASURING METHOD FOR THE SAME

BACKGROUND OF THE INVENTION

1. Field of the Invention

The present invention relates to a bit error measuring device for a modem device and a bit error measuring method for the same, which can control a transmission of a test pattern signal by detecting a signal, for example, a CS (Clear to Send) signal of an RS (Request to Send)/CS hardware control signal, which is outputted from a modem device connected with a data processing device through a connector, for example, an RS-232-C connector standardized by Electronic Industries Association, when a data communication flow control is carried out between a communication network and the data processing device.

2. Description of the Related Art

FIG. 4 shows a construction of a typical bit error measuring device for a modem device, which is connected with a data processing device, such as a personal computer, through an RS-232-C connector. The construction of the bit error measuring device will be explained. In FIG. 4, the bit error measuring device comprises a bit error measuring circuit 11, a test pattern transmitting circuit 12 and a clock controlling circuit 13.

The bit error measuring circuit 11 measures (or detects) a bit error in an input signal 11A outputted from a modem device (not shown in the figure), which is a pseudo-random pattern recommended by International Telecommunications Union—Telecommunication (hereinafter, referred as to ITU-T). The test pattern transmitting circuit 12 outputs a test pattern signal 12A which is a random code recommended by ITU-T, to the outside of the bit error measuring device by synchronizing it with a test pattern synchronizing clock signal 13A outputted from the clock controlling circuit 13. As shown in FIG. 5, the clock controlling circuit 13 divides a basic clock signal by using a dividing circuit 15 and generates the test pattern synchronizing clock signal 13A to output it to the test pattern transmitting circuit 12.

According to the bit error measuring device as shown in FIG. 4, the test pattern transmitting circuit 12 outputs a test pattern signal 12A to the outside of the bit error measuring device by synchronizing it with a test pattern synchronizing clock signal 13A outputted from the clock controlling circuit 13. However, because the bit error measuring device cannot detect a CS signal outputted from the modem device when the flow control is carried out, there is a problem that a control of stopping or retransmitting the test pattern signal to be outputted to the outside of the bit error measuring device cannot be carried out.

SUMMARY OF THE INVENTION

The present invention was developed in view of these problems.

An object of the present invention is to provide a bit error measuring device for a modem device or a bit error measuring method for the same, which can detect a signal outputted from the modem device in order to control a test pattern synchronizing clock signal in accordance with the signal outputted from the modem device, and which can carry out a control of stopping or retransmitting a test pattern signal in order to measure (or detect) a bit error when a flow control is carried out by the modem device.

That is, in accordance with one aspect of the present invention, the bit error measuring device for modem device, for measuring bit errors when a flow control operation is carried out, comprises;

a bit error measuring unit for measuring bit errors in an input signal inputted thereinto from the modem device, a clock controlling unit for outputting a test pattern synchronizing clock signal to a test pattern transmitting unit, the test pattern transmitting unit for transmitting a test pattern signal when the flow control operation is carried out by the modem device, and a stop bit detecting unit for outputting a stop bit detecting signal by detecting a stop bit in the test pattern signal transmitted by the test pattern transmitting unit, wherein the test pattern synchronizing clock signal controls a transmission/stop operation of the test pattern signal on the basis of the stop bit detecting signal outputted from the stop bit detecting unit and a CS signal outputted from the modem device.

According to the above-described bit error measuring device for modem device, the bit error measuring unit measures bit errors in an input signal inputted thereinto from the modem device. The clock controlling unit outputs a test pattern synchronizing clock signal for controlling a transmission/stop operation of the test pattern signal on the basis of the stop bit detecting signal outputted from the stop bit detecting unit and a CS signal outputted from the modem device. The test pattern transmitting unit transmits a test pattern signal when the flow control operation is carried out by the modem device. The stop bit detecting unit detects a stop bit in the test pattern signal transmitted by the test pattern transmitting unit in order to output a stop bit detecting signal.

Because the test pattern signal is stopped or transmitted in accordance with the state of the stop bit, a bit error measurement can be carried out for the modem device when a flow control is carried out by the modem device between a communication network and the data processing device.

The clock controlling unit may comprise:

a start judging unit for outputting a start bit judging signal by judging that a "High" level output is detected in the CS signal outputted from the modem device on the basis of a basic clock signal for setting a timing of each transmission/stop operation of the test pattern signal, and a stop judging unit for stopping the test pattern transmitting unit from transmitting the test pattern signal on the basis of the stop bit detecting signal outputted from the stop bit detecting unit and the CS signal outputted from the modem device, and for controlling the test pattern synchronizing clock signal so as to retransmit the test pattern signal by the test pattern transmitting unit on the basis of the start judging signal outputted from the start judging unit.

In accordance with another aspect of the present invention, the bit error measuring method for modem device, for measuring bit errors when a flow control operation is carried out, comprises the steps of;

measuring bit errors in an input signal inputted from the modem device, controlling a transmission/stop operation of a test pattern signal by generating a test pattern synchronizing clock signal on the basis of a stop bit detecting signal and a CS signal outputted from the modem device, transmitting the test pattern signal when the flow control operation is carried out by the modem device, and generating the stop bit detecting signal by detecting a stop bit in the test pattern signal.

According to the above-described bit error measuring method for modem device, bit errors are measured in an input signal inputted from the modem device. A transmission/stop operation of the test pattern signal is controlled by generating a test pattern synchronizing clock signal on the basis of the stop bit detecting signal and a CS signal outputted from the modem device. A test pattern signal is transmitted when the flow control operation is carried out by the modem device. A stop bit detecting signal is generated by detecting a stop bit in the test pattern signal.

Because the test pattern signal is stopped or transmitted in accordance with the state of the stop bit, a bit error measurement can be carried out for the modem device when a flow control is carried out by the modem device between a communication network and the data processing device.

The step of control the transmission/stop operation of the test pattern signal may comprise the steps of;

outputting a start bit judging signal by judging that a "High" level output is detected in the CS signal outputted from the modem device on the basis of a basic clock signal for setting a timing of each transmission/stop operation of the test pattern signal, and stopping of a transmission of the test pattern signal on the basis of the stop bit detecting signal and the CS signal outputted from the modem device, and controlling the test pattern synchronizing clock signal so as to retransmit the test pattern signal on the basis of the start judging signal outputted when it is judged that the "High" level output is detected.

In accordance with another aspect of the present invention, the bit error measuring device for modem device, comprises;

a bit error measuring unit for measuring a bit error in an input signal from the modem device, a clock controlling unit for controlling an output of a clock signal on the basis of a control signal outputted from the modem device, and a test pattern transmitting unit for transmitting a test pattern signal by synchronizing with the clock signal when clock pulses of the clock signal are outputted from the clock controlling unit, and for stopping a transmission of the test pattern signal when the clock pulses of the clock signal are not outputted from the clock controlling unit.

In accordance with another aspect of the present invention, the bit error measuring method for modem device, comprising the steps of;

measuring a bit error in an input signal from the modem device, controlling an output of a clock signal on the basis of a control signal outputted from the modem device, and transmitting a test pattern signal by synchronizing with the clock signal when clock pulses of the clock signal are outputted, and stopping a transmission of the test pattern signal when the clock pulses of the clock signal are not outputted.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, an embodiment of the bit error measuring device for a modem device and bit error measuring method for the same according to the present invention will be explained in detail with reference to the attached drawings.

Figure 1:
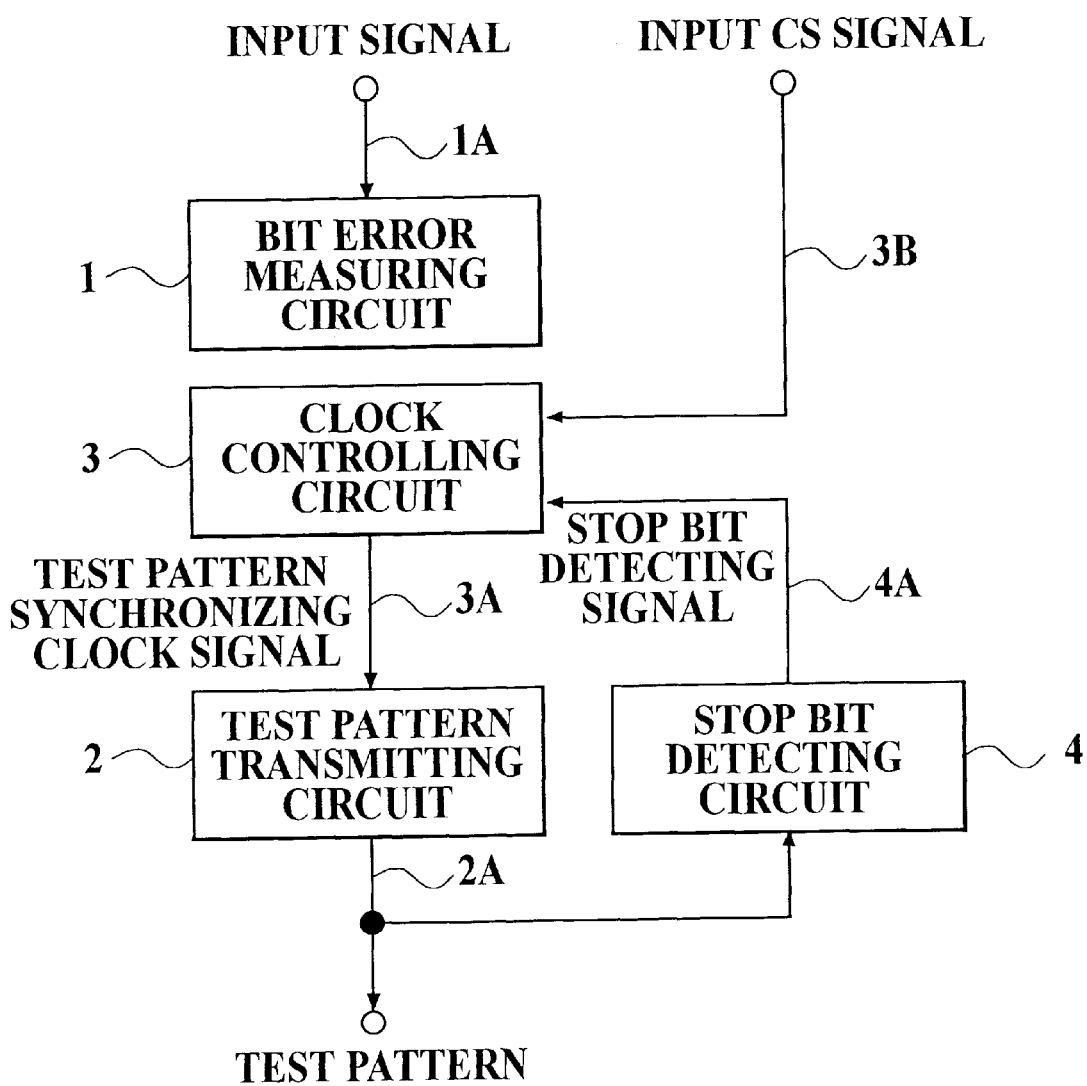
FIG. 1 is a block diagram showing a circuit construction of an embodiment of bit error measuring device according to the present invention.
Figure 2:
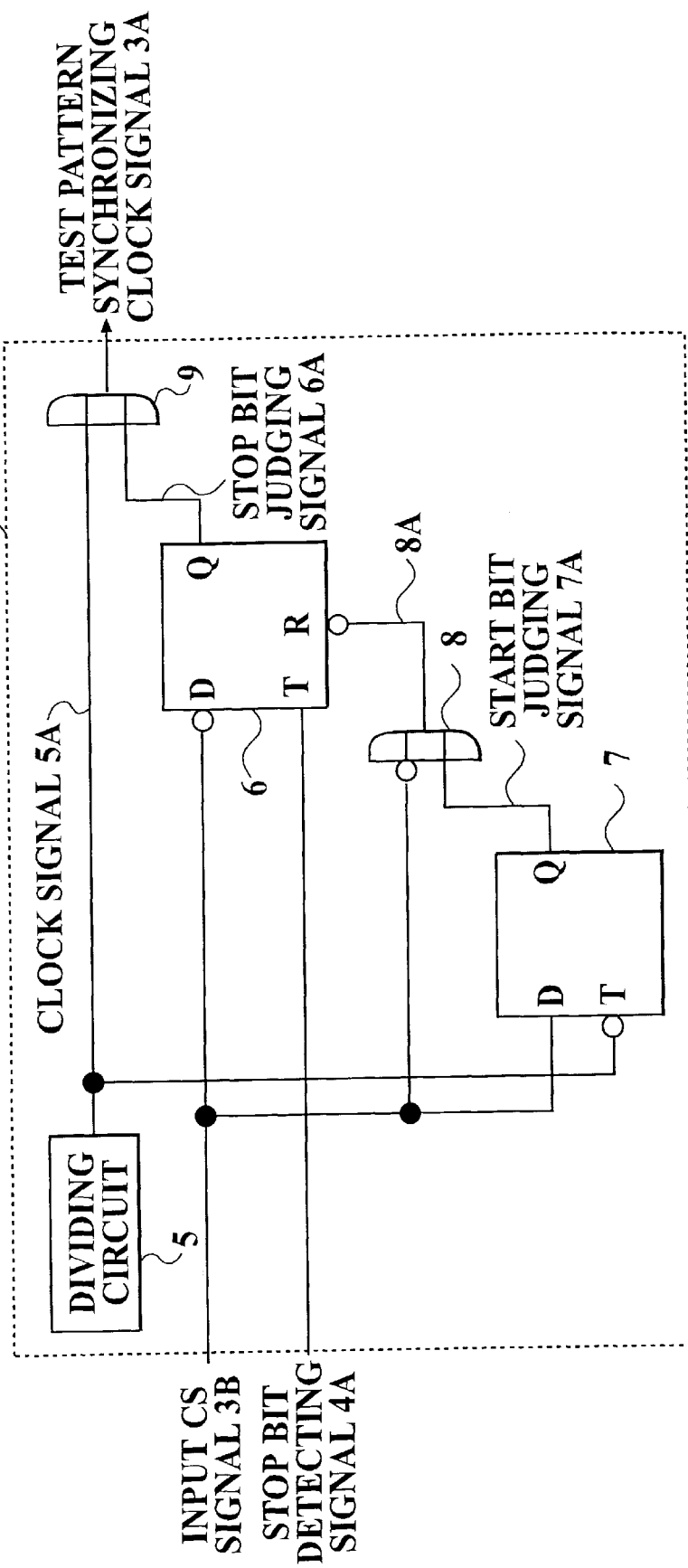
FIG. 2 is a block diagram showing a circuit construction of the clock controlling circuit shown in FIG. 1.
Figure 3:
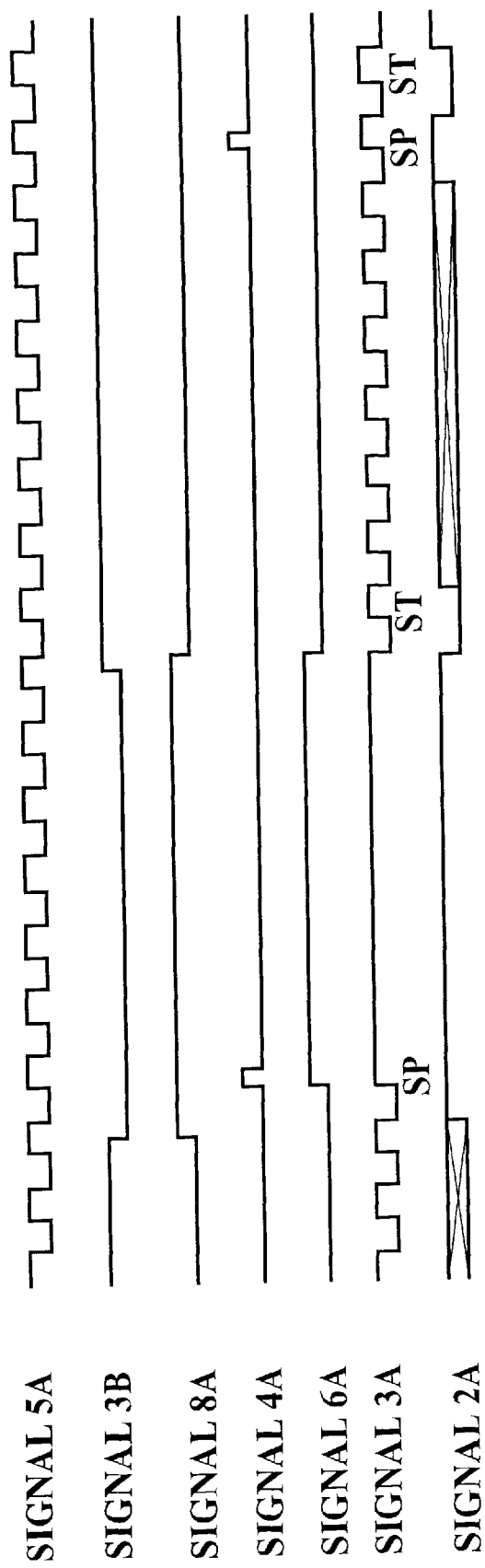
FIG. 3 is a time chart showing a state of each signal in the clock controlling circuit shown in FIG. 2.
Figure 4:
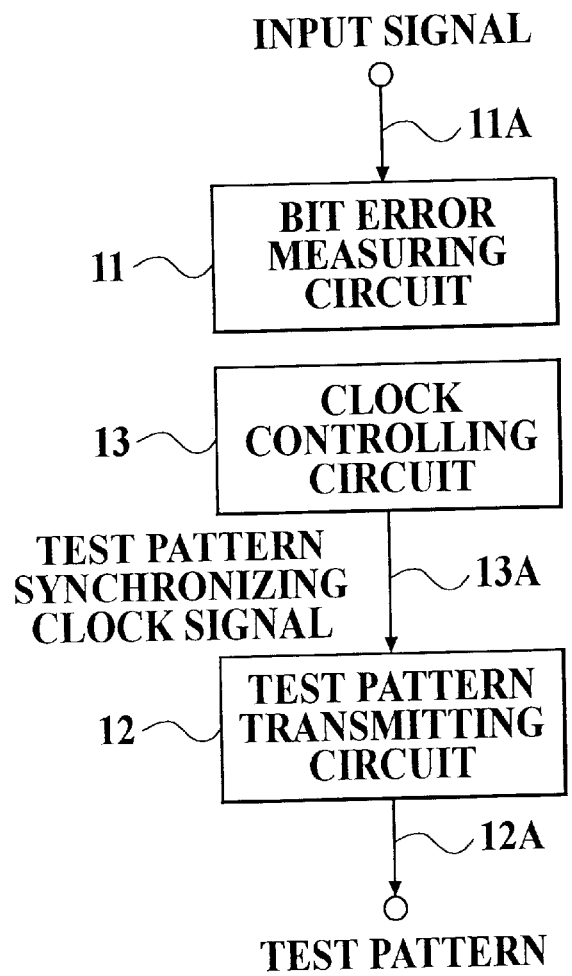
FIG. 4 is a block diagram showing a circuit construction of a bit error measuring device according to the earlier development.
Figure 5:
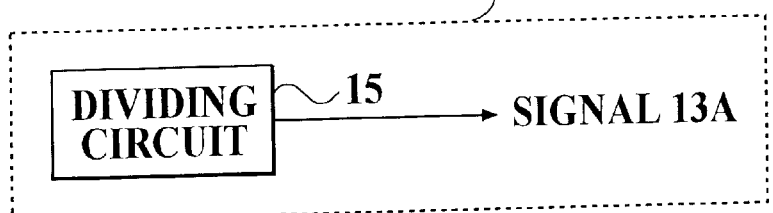
FIG. 5 is a block diagram showing a circuit construction of the clock controlling circuit shown in FIG. 4.

FIGS. 1 to 3 show an embodiment of the bit error measuring device for a modem device according to the present invention.

First, the construction of the bit error measuring device will be explained.

FIG. 1 is a block diagram showing a circuit construction of an embodiment of bit error measuring device. In FIG. 1, the bit error measuring device comprises a bit error measuring circuit 1, a test pattern transmitting circuit 2, a clock controlling circuit 3 and a stop bit detecting circuit 4.

The bit error measuring circuit 1 measures (or detects) a bit error in an input signal 1A outputted from a modem device (not shown in the figure), which is a pseudo-random pattern recommended by International Telecommunications Union—Telecommunication (hereinafter, referred as to ITU-T). The test pattern transmitting circuit 2 outputs a test pattern signal 2A which is a random code recommended by ITU-T, to the outside of the bit error measuring device and to the stop bit detecting circuit 4 by synchronizing it with a test pattern synchronizing clock signal 3A outputted from the clock controlling circuit 3.

As shown in FIG. 2, the clock controlling circuit 3 comprises a dividing circuit 5, a stop judging circuit 6, a start judging circuit 7 and gate circuits 8 and 9.

The dividing circuit 5 generates a clock signal 5A by dividing a basic clock signal in order to output it to the start judging circuit 7 and the gate circuit 9. The stop judging circuit 6 judges whether a stop bit is detected or not on the basis of a stop bit detecting signal 4A outputted from the stop bit detecting circuit 4 shown in FIG. 1, when an input CS signal 3B outputted from the modem device (not shown in the figures), is a "Low" level signal. Further, the stop judging circuit 6 outputs a stop bit judging signal 6A to the gate circuit 9 in order to send out the result of the above judgment. For example, when the stop judging circuit 6 judged the stop bit was detected, the stop bit judging signal 6A is outputted as a "High" level signal. When the stop judging circuit 6 judged the stop bit was not detected, the stop bit judging signal 6A is outputted as a "Low" level signal. The control of transmitting or stopping a test pattern synchronizing clock signal 3A is carried out by outputting the stop bit judging signal 6A to the gate circuit 9.

The start judging circuit 7 judges whether the start bit is detected or not in the input CS signal 3B outputted from the modem device (not shown in the figures), on the basis of the clock signal 5A outputted from the dividing circuit 5. Further, the start judging circuit 7 outputs a start bit judging signal 7A to the gate circuit 8 in order to send out the result of the above judgment. For example, when the start judging circuit 7 judged the start bit was detected, the start bit judging signal 7A is outputted as a "High" level signal. When the start judging circuit 7 judged the start bit was not detected, the start bit judging signal 7A is outputted as a "Low" level signal. The start bit judging signal 7A is outputted to the stop judging circuit 6 through the gate circuit 8 in order to set or reset the stop bit judging signal 6A of the stop judging circuit 6. As a result, the control of transmitting or stopping a test pattern synchronizing clock signal 3A is carried out.

The gate circuit 8 carries out an OR operation of two signals which are an inverted input CS signal outputted from the external modem device and the start bit judging signal 7A outputted from the start judging circuit 7. Further, the gate circuit 8 outputs a reset signal 8A (which is an active "High" signal) for setting or resetting the stop bit judging signal 6A outputted from the stop judging circuit 6, to a reset terminal "R" of the stop judging circuit 6

The gate circuit 9 carries out an OR operation of two signals which are the clock signal 5A outputted from the dividing circuit 5 and the stop judging signal 6A outputted from the stop judging circuit 6 in order to transmit or to stop the test pattern synchronizing clock signal 3A.

That is, the clock controlling circuit 3 shown in FIG. 2 carries out the control of transmitting or stopping the test pattern synchronizing clock 3A by detecting the input CS signal 3B.

In FIG. 1, the stop bit detecting circuit 4 detects the stop bit in the test pattern signal 2A outputted from the test pattern transmitting circuit 2. Further, the stop bit detecting circuit 4 outputs the stop bit detecting signal 4A to the clock controlling circuit 3 in order to send the result of the above detection.

Next, the operation of the above embodiment will be explained.

The operations of the bit error measuring device shown in FIG. 1 and the clock controlling circuit 3 shown in FIG. 2 will be explained with reference to a time chart of each signal, which is shown in FIG. 3.

In FIG. 3, signal 5A denotes a clock signal outputted from the dividing circuit 5 shown in FIG. 2, signal 3B denotes an input CS signal 3B outputted from an external modem device, signal 8A denotes a reset signal outputted from the gate circuit 8 shown in FIG. 2, signal 4A denotes a stop bit detecting signal outputted from the stop bit detecting circuit 4 shown in FIG. 1, signal 6A denotes a stop bit judging signal outputted from the stop judging circuit 6 shown in FIG. 2, signal 3A denotes a test pattern synchronizing clock signal outputted from the clock controlling circuit 3 show in FIG. 2, and signal 2A denotes a test pattern signal outputted from the test pattern transmitting circuit 2 shown in FIG. 1.

As shown in FIG. 1, an bit error is measured (or detected) by the bit error measuring circuit 1, in the input signal 1A outputted from the external modem device (not shown in figures), which is a pseudo-random pattern recommended by ITU-T. The test pattern signal 2A which is a random code recommended by ITU-T, is outputted from the test pattern transmitting circuit 2 to the outside of the bit error measuring device and to the stop bit detecting circuit 4 by synchronizing it with the test pattern synchronizing clock signal 3A outputted from the clock controlling circuit 3.

The test pattern signal 2A is outputted from the test pattern transmitting circuit 2 while the test pattern synchronizing clock signal 3A repeats a clock operation (or while clock pulses of the test pattern synchronizing clock signal 3A are outputted from the clock controlling circuit 3). That is, the stop bit SP is outputted at the time that the clock operation of the test pattern synchronizing clock signal 3A is stopped (or at the time that the clock controlling circuit 3 stops outputting the clock pulses of the test pattern synchronizing clock signal 3A). While the test pattern synchronizing clock signal 3A keeps "High", the test pattern transmitting circuit 2 stops outputting the test pattern signal 2A. On the other hand, the start bit ST is outputted at the time that the clock operation of the test pattern synchronizing clock signal 3A is started (or at the time that the clock controlling circuit 3 starts outputting the clock pulses of the test pattern synchronizing clock signal 3A). When the clock controlling circuit 3 starts outputting the clock pulses of the test pattern synchronizing clock signal 3A, the test pattern signal 2A outputs again by synchronizing it with the clock signal 3A.

In the clock controlling circuit 3 shown in FIG. 3, the clock pulses of the test pattern synchronizing clock signal 3A are stopped by the following operation. The reset signal 8A outputted from the gate circuit 8 is inverted from a "Low" level signal to a "High" level signal by the input CS signal 3B. The stop bit judging signal 6A is outputted to the gate circuit 9 as a "High" level signal at the timing that the voltage of the stop bit detecting signal 4A outputted from the stop bit detecting circuit 4 rises. Because the stop bit judging signal 6A is a "High" signal, the test pattern synchronizing clock signal 3A keeps "High". As a result, the clock pulses of the test pattern synchronizing clock signal 3A are stopped.

That is, the stop bit SP is detected by the stop bit detecting circuit 4 on the basis of the stop pattern signal 2A outputted from the test transmitting circuit 2. At the time that the voltage of the stop bit detecting signal 4A rises, the stop judging circuit 6 judges that the stop bit exists. As shown in FIG. 3, the stop bit judging signal 6A is inverted from a "Low" level signal to a "High" level signal, and is outputted to the gate circuit 9 as a "High" level signal. Because the test pattern synchronizing clock signal 3A keeps "High", the clock pulses thereof are stopped.

The operation of retransmitting the test pattern signal 2A outputted from the test pattern transmitting circuit 2 is carried out as follows. In the clock controlling circuit 3, when the input CS signal 3B is inverted from a "Low" level signal to a "High" level signal, the start judging circuit 7 judges that the start bit exists on the basis of the clock timing of the clock signal 5A outputted from the dividing circuit 5, which is inputted thereinto so as to be inverted. Further, the start judging circuit 7 outputs the start judging signal 7A to the gate circuit 8 as a "High" level signal. The gate circuit 8 carries out the OR operation of the two signals which are the input CS signal 3B outputted from the external modem device and inputted into the gate circuit 8 as a "Low" level signal, and the start bit judging signal 7A outputted from the start judging circuit 7 as a "High" level signal. The signal 8 inverted from a "High" level signal to a "Low" level signal is outputted to the stop judging circuit 6.

In the stop judging circuit 6, the state of keeping the signal level of the stop bit judging signal 6A is reset by the reset signal 8A outputted from the gate circuit 8. Because the stop bit judging signal 6A is inverted from a "High" level signal to a "Low" level signal as shown in FIG. 3, the clock pulses of the test pattern synchronizing clock signal 3A are outputted from the gate circuit 9. As a result, the clock pulses of the test pattern synchronizing clock signal 3A are supplied to the test pattern transmitting circuit 2 again.

By the above-described operation, the test pattern signal 2A outputted from the test pattern transmitting circuit 2 is retransmitted.

As described above, in the bit error measuring device according to the present invention, because the stop bit of the test pattern signal 2A outputted from the test pattern transmitting circuit 2 is detected by the stop bit detecting circuit 4 and the clock controlling circuit 3 stops supplying the clock pulses of the test pattern synchronizing clock signal 3A to the test pattern transmitting circuit 2 by synchronizing with the stop bit, the test pattern signal 2A to be outputted from the test pattern transmitting circuit 2 can be stopped in accordance with the state of the stop bit, and can be transmitted by synchronizing with the synchronizing clock. As a result, a bit error measurement can be carried out for the modem device when a flow control is carried out by the modem device between a communication network and the data processing device.

In the clock controlling circuit, the operation of stopping or retransmitting the clock signal may be directly controlled by a control signal, for example, the CS signal, which is outputted from the modem device.

Further, the present invention can be applied to a test pattern transmitting device for transmitting or stopping a test pattern by receiving a control signal outputted from the outside thereof.

The entire disclosure of Japanese Patent Application No. Tokugan-Hei 9-324893 filed on Nov. 26, 1997 including specification, claims drawings and summary are incorporated herein by reference in its entirety.

What is claimed is:

1. A bit error measuring device for modem device, for measuring bit errors when a flow control operation is carried out, comprising;
   a bit error measuring unit for measuring bit errors in an input signal inputted thereinto from the modem device,
   a clock controlling unit for outputting a test pattern synchronizing clock signal to a test pattern transmitting unit,
   the test pattern transmitting unit for transmitting a test pattern signal when the flow control operation is carried out by the modem device, and
   a stop bit detecting unit for outputting a stop bit detecting signal by detecting a stop bit in the test pattern signal transmitted by the test pattern transmitting unit,
   wherein the test pattern synchronizing clock signal controls a transmission/stop operation of the test pattern signal on the basis of the stop bit detecting signal outputted from the stop bit detecting unit and a CS signal outputted from the modem device.

2. A bit error measuring device for modem device as claimed in claim 1; wherein the clock controlling unit comprises;
   a start judging unit for outputting a start bit judging signal by judging that a "High" level output is detected in the CS signal outputted from the modem device on the basis of a basic clock signal for setting a timing of each transmission/stop operation of the test pattern signal, and
   a stop judging unit for stopping the test pattern transmitting unit from transmitting the test pattern signal on the basis of the stop bit detecting signal outputted from the stop bit detecting unit and the CS signal outputted from the modem device, and for controlling the test pattern synchronizing clock signal so as to retransmit the test pattern signal by the test pattern transmitting unit on the basis of the start judging signal outputted from the start judging unit.

3. A bit error measuring method for modem device, for measuring bit errors when a flow control operation is carried out, comprising the steps of;
   measuring bit errors in an input signal inputted from the modem device,
   controlling a transmission/stop operation of a test pattern signal by generating a test pattern synchronizing clock signal on the basis of a stop bit detecting signal and a CS signal outputted from the modem device,
   transmitting the test pattern signal when the flow control operation is carried out by the modem device, and
   generating the stop bit detecting signal by detecting a stop bit in the test pattern signal.

4. A bit error measuring method for modem device as claimed in claim 3; wherein the step of controlling the transmission/stop operation of the test pattern signal comprises the steps of;
   outputting a start bit judging signal by judging that a "High" level output is detected in the CS signal outputted from the modem device on the basis of a basic clock signal for setting a timing of each transmission/stop operation of the test pattern signal, and
   stopping of a transmission of the test pattern signal on the basis of the stop bit detecting signal and the CS signal outputted from the modem device, and controlling the test pattern synchronizing clock signal so as to retransmit the test pattern signal on the basis of the start judging signal outputted when it is judged that the "High" level output is detected.

5. A bit error measuring device for modem device, comprising;
   a bit error measuring unit for measuring a bit error in an input signal from the modem device,
   a clock controlling unit for controlling an output of a clock signal on the basis of a control signal outputted from the modem device, and
   a test pattern transmitting unit for transmitting a test pattern signal by synchronizing with the clock signal when clock pulses of the clock signal are outputted from the clock controlling unit, and for stopping a transmission of the test pattern signal when the clock pulses of the clock signal are not outputted from the clock controlling unit.

6. The bit error measuring device for modem device as claimed in claim 5, wherein the clock controlling unit comprises a clock signal starting circuit for starting the out put of the clock signal in accordance with the control signal.

7. A bit error measuring device for modem device as claimed in claim 5, further comprising;
   a stop bit detecting unit for detecting a stop bit in the test pattern signal and for outputting a stop bit detecting signal to the clock controlling circuit in order to stop outputting the clock pulses of the clock signal.

8. The bit error measuring device for modem device as claimed in claim 7, wherein the clock controlling unit comprises a clock signal stopping circuit for stopping the output of the clock signal in accordance with the stop bit detecting signal and the control signal.

9. A bit error measuring method for modem device, comprising the steps of;
   measuring a bit error in an input signal from the modem device,
   controlling an output of a clock signal on the basis of a control signal outputted from the modem device, and
   transmitting a test pattern signal by synchronizing with the clock signal when clock pulses of the clock signal are outputted, and stopping a transmission of the test pattern signal when the clock pulses of the clock signal are not outputted.

10. A bit error measuring device for modem method as claimed in claim 9, further comprising the step of;

detecting a stop bit in the test pattern signal and outputting a stop bit detecting signal in order to stop outputting the clock pulses of the clock signal.

* * * * *